(12) United States Patent
Jiang et al.

(10) Patent No.: US 10,346,669 B2
(45) Date of Patent: Jul. 9, 2019

(54) FINGERPRINT ENTRY PROMPTING METHOD AND DEVICE

(71) Applicant: Beijing Xiaomi Mobile Software Co., Ltd., Beijing (CN)

(72) Inventors: Zhongsheng Jiang, Beijing (CN); Chuanshun Ji, Beijing (CN); Gang Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 170 days.

(21) Appl. No.: 15/586,966

(22) Filed: May 4, 2017

(65) Prior Publication Data
US 2017/0364730 A1    Dec. 21, 2017

(30) Foreign Application Priority Data

Jun. 17, 2016   (CN) .......................... 2016 1 0440425

(51) Int. Cl.
  *G06K 9/00*   (2006.01)
  *G06K 9/03*   (2006.01)
  *G06F 9/451*  (2018.01)

(52) U.S. Cl.
  CPC .......... *G06K 9/00026* (2013.01); *G06F 9/453* (2018.02); *G06K 9/00912* (2013.01); *G06K 9/036* (2013.01)

(58) Field of Classification Search
  None
  See application file for complete search history.

(56) References Cited

U.S. PATENT DOCUMENTS 6,546,122 B1    4/2003  Russo
7,236,617 B1    6/2007  Yau et al.
(Continued)

FOREIGN PATENT DOCUMENTS

CN    1826605 A    8/2006
CN    102708360 A  10/2012
(Continued)

OTHER PUBLICATIONS

Extended European Search Report of European Patent Application No. 17160430.9, from the European Patent Office, dated Oct. 10, 2017.
(Continued)

*Primary Examiner* — Justin P. Misleh
(74) *Attorney, Agent, or Firm* — Finnegan, Henderson, FArabow, Garrett & Dunner LLP

(57) ABSTRACT

A fingerprint entry prompting method, includes: obtaining an $i^{th}$ entered fingerprint image, during a process of collecting and combining N fingerprint images entered in sequence to generate a fingerprint template of a user, wherein $N \geq i \geq 2$, and N and i are integers; obtaining an overlap region between the $i^{th}$ entered fingerprint image and a determined template image, wherein the determined template image is generated by combining i−1 previously entered fingerprint images; and presenting a prompting message when the overlap region satisfies a prompting condition, wherein the prompting message is configured to instruct the user to move a finger towards a specified direction and re-enter the $i^{th}$ fingerprint image.

11 Claims, 7 Drawing Sheets

(56) References Cited

U.S. PATENT DOCUMENTS

| | | | |
|---|---|---|---|
| 2014/0003677 A1 | 1/2014 | Han et al. | |
| 2015/0131876 A1* | 5/2015 | Chang | G06K 9/00013 382/124 |
| 2015/0235098 A1* | 8/2015 | Lee | G06K 9/00912 715/709 |
| 2016/0117545 A1* | 4/2016 | Chiang | G06K 9/00087 382/124 |
| 2016/0203354 A1 | 7/2016 | Choi et al. | |
| 2016/0217310 A1* | 7/2016 | Shah | G06K 9/001 |
| 2016/0253544 A1* | 9/2016 | Weber | G06F 1/1626 382/124 |
| 2016/0321494 A1* | 11/2016 | Shin | G06K 9/00013 |
| 2017/0091521 A1* | 3/2017 | Tieu | G06K 9/00067 |
| 2017/0323142 A1* | 11/2017 | Chung | G06K 9/00026 |

FOREIGN PATENT DOCUMENTS

| | | |
|---|---|---|
| CN | 104615991 A | 5/2015 |
| CN | 105051753 A | 11/2015 |
| CN | 105094645 A | 11/2015 |
| CN | 105095719 A | 11/2015 |
| CN | 105095720 A | 11/2015 |
| CN | 105184218 A | 12/2015 |
| CN | 105373786 A | 3/2016 |
| CN | 105528576 A | 4/2016 |
| CN | 105549872 A | 5/2016 |
| CN | 106127129 A | 11/2016 |
| JP | 2005-143890 A | 6/2005 |
| KR | 10-2016-0018318 A | 2/2016 |
| RU | 2373573 C2 | 11/2009 |

OTHER PUBLICATIONS

Partial European Search Report of European Patent Application No. 17160430.9, from the European Patent Office, dated Jul. 31, 2017.

PCT International Search Report issued from the Chinese Patent Office; dated Mar. 16, 2017, for International Application No. PCT/CN2016/110768.

* cited by examiner

FINGERPRINT ENTRY PROMPTING METHOD AND DEVICE

CROSS-REFERENCE TO RELATED APPLICATIONS

This application is based upon and claims priority to Chinese Patent Application No. 201610440425.3, filed on Jun. 17, 2016, the entire contents of which are incorporated herein by reference.

TECHNICAL FIELD

The present disclosure generally relates to the field of pattern recognition technologies, and more particularly, to a fingerprint entry prompting method and device.

BACKGROUND

With the development of fingerprint recognition technologies, more and more terminal devices support a fingerprint recognition function. Generally, a user needs to enter a fingerprint template before using a terminal device with the fingerprint recognition function.

Limited by a size of the terminal device, the terminal device generally has a fingerprint collecting unit of a relatively small size, which can collect only a part of a fingerprint of the user each time. To increase recognition accuracy, generally the terminal device, when collecting a fingerprint template of the user, repeatedly instructs the user to enter the fingerprint by means of the fingerprint collecting unit, until the terminal device has collected fingerprint images of all different parts of the fingerprint. However, in this process, the user may not know which part(s) of the fingerprint that the fingerprint images have not been collected by the terminal device.

SUMMARY

According to a first aspect of the present disclosure, there is provided a fingerprint entry prompting method, comprising: obtaining an $i^{th}$ entered fingerprint image, during a process of collecting and combining N fingerprint images entered in sequence to generate a fingerprint template of a user, wherein $N \geq i \geq 2$, and N and i are integers; obtaining an overlap region between the $i^{th}$ entered fingerprint image and a determined template image, wherein the determined template image is generated by combining i−1 previously entered fingerprint images; and presenting a prompting message when the overlap region satisfies a prompting condition, wherein the prompting message is configured to instruct the user to move a finger towards a specified direction and re-enter the $i^{th}$ fingerprint image.

According to a second aspect of the present disclosure, there is provided a fingerprint entry prompting device, comprising: a processor; and a memory for storing instructions executable by the processor; wherein the processor is configured to: obtain an $i^{th}$ entered fingerprint image, during a process of collecting and combining N fingerprint images entered in sequence to generate a fingerprint template of a user, wherein $N \geq i \geq 2$, and N and i are integers; obtain an overlap region between the $i^{th}$ entered fingerprint image and a determined template image, wherein the determined template image is generated by combining i−1 previously entered fingerprint images; and present a prompting message when the overlap region satisfies a prompting condition, wherein the prompting message is configured to instruct the user to move a finger towards a specified direction and re-enter the $i^{th}$ fingerprint image.

According to a third aspect of the present disclosure, there is provided a non-transitory computer-readable storage medium having stored therein instructions that, when executed by a processor in a device, cause the device to perform a fingerprint entry prompting method comprising: obtaining an $i^{th}$ entered fingerprint image, during a process of collecting and combining N fingerprint images entered in sequence to generate a fingerprint template of a user, wherein $N \geq i \geq 2$, and N and i are integers; obtaining an overlap region between the $i^{th}$ entered fingerprint image and a determined template image, wherein the determined template image is generated by combining i−1 previously entered fingerprint images; and presenting a prompting message when the overlap region satisfies a prompting condition, wherein the prompting message is configured to instruct the user to move a finger towards a specified direction and re-enter the $i^{th}$ fingerprint image.

It will be appreciated that the above general description and the following detailed description are merely exemplary and illustrative, and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

Specific embodiments of the present disclosure are shown by the above drawings, and a more detailed description will be provided hereinafter. These drawings and text description are not for limiting the scope of conceiving the present disclosure in any way, but for illustrating the concept of the present disclosure for those skilled in the art by referring to specific embodiments.

DETAILED DESCRIPTION

Reference will now be made in detail to exemplary embodiments, examples of which are illustrated in the accompanying drawings. The following description refers to the accompanying drawings in which the same reference numbers throughout different drawings represent the same or similar elements, unless otherwise specified. The implementations set forth in the following description of exemplary embodiments do not represent all implementations consistent with the invention. Instead, they are merely examples of devices and methods consistent with aspects related to the present disclosure as recited in the appended claims.

Figure 1:
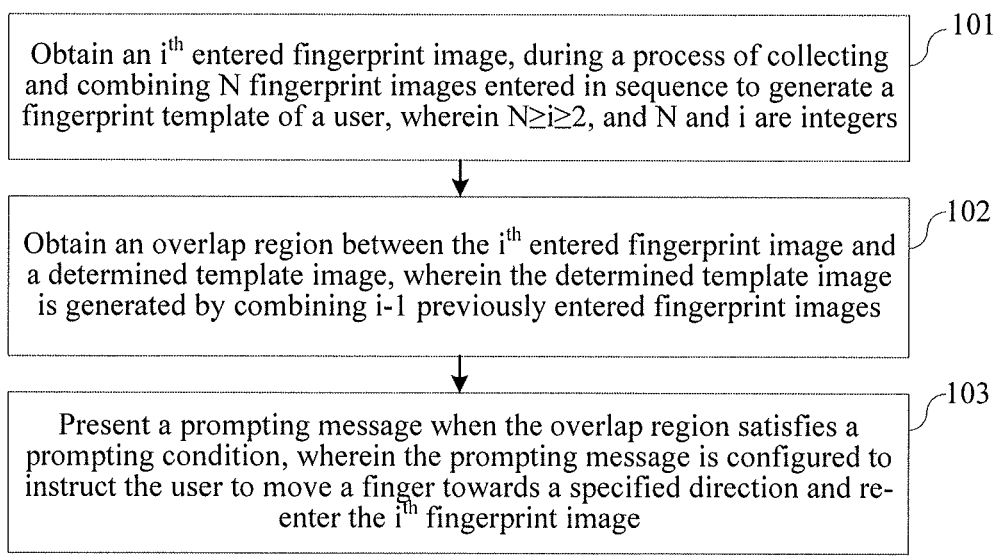
FIG. 1 is a flow chart of a fingerprint entry prompting method, according to an exemplary embodiment.

FIG. 1 is a flow chart of a fingerprint entry prompting method 100, according to an exemplary embodiment. The fingerprint entry prompting method 100 may be applied to a terminal device having a fingerprint entry prompting function. For example, the terminal device may be a smart phone, a tablet, an e-book reader, a smart wearable device, and the like. The fingerprint entry prompting method 100 may include the following steps.

In step 101, an $i^{th}$ entered fingerprint image is obtained, during a process of collecting and combining N fingerprint images entered in sequence to generate a fingerprint template of a user, wherein N≥i≥2, and N and i are integers.

In step 102, an overlap region between the $i^{th}$ entered fingerprint image and a determined template image is obtained, wherein the determined template image is generated by combining i−1 previously entered fingerprint images.

In step 103, a prompting message is presented when the overlap region satisfies a prompting condition, wherein the prompting message is configured to instruct the user to move the finger towards a specified direction and re-enter the $i^{th}$ fingerprint image.

In the fingerprint entry prompting method 100, prompt information for instructing the user to move the finger can be provided during the generation of a fingerprint template of the user, thereby improving efficiency for the user to move the finger and for obtaining a fingerprint image for a part of the fingerprint that has not been collected by the terminal device.

Figure 2:
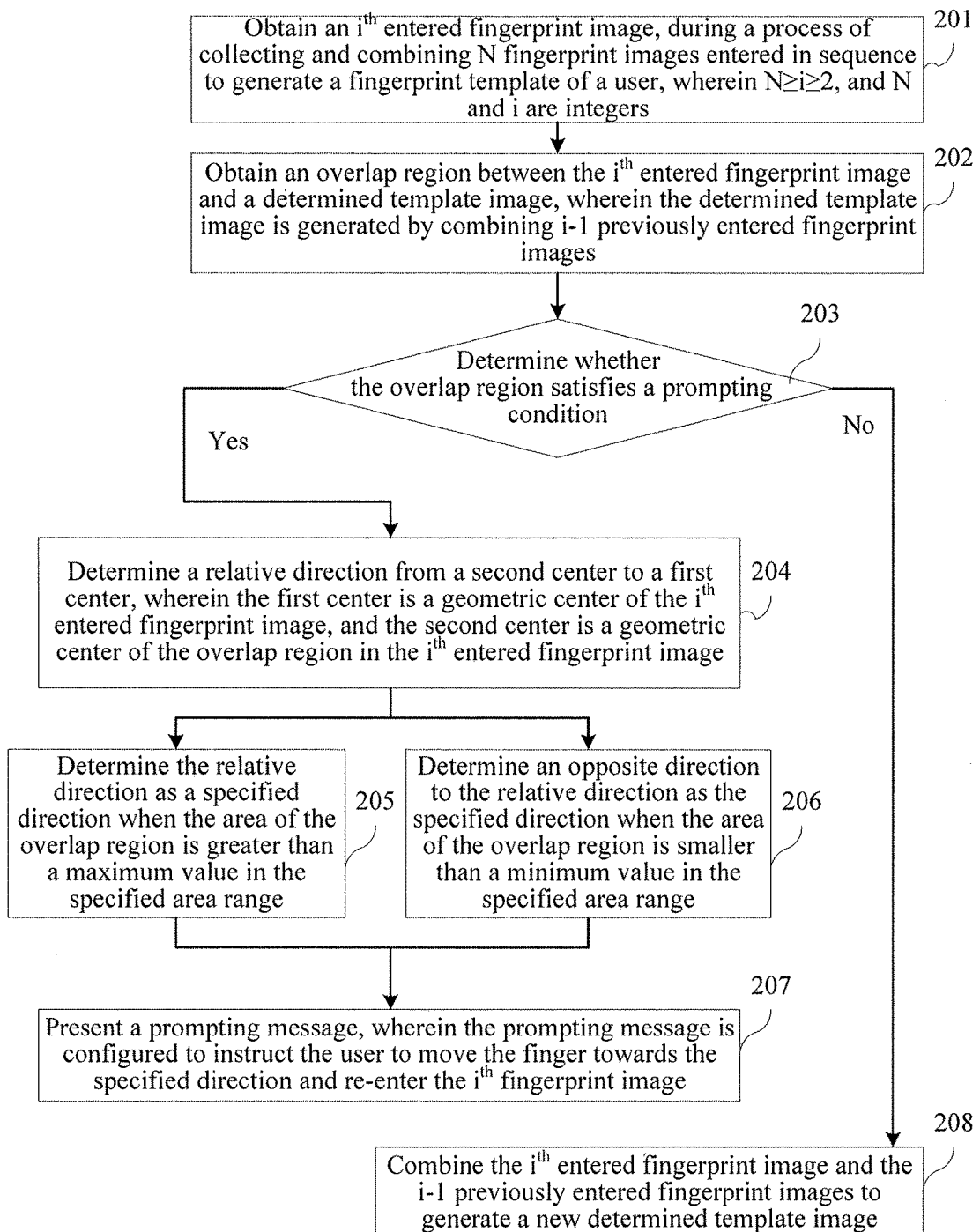
FIG. 2 is a flow chart of a fingerprint entry prompting method, according to an exemplary embodiment.

FIG. 2 is a flow chart of a fingerprint entry prompting method 200, according to an exemplary embodiment. The fingerprint entry prompting method 200 may be applied to a terminal device having a fingerprint entry prompting function. For example, the terminal device may be a smart phone, a tablet, an e-book reader, a smart wearable device, and the like. The fingerprint entry prompting method may include the following steps.

In step 201, an $i^{th}$ entered fingerprint image is obtained, during a process of collecting and combining N fingerprint images entered in sequence to generate a fingerprint template of a user, wherein N≥i≥2, and N and i are integers.

In the exemplary embodiments, to generate the fingerprint template of the user, the terminal device needs to collect multiple fingerprint images that are entered in sequence, and combine the multiple fingerprint images into the fingerprint template. When collecting the N fingerprint images entered in sequence, the terminal device obtains the $i^{th}$ entered fingerprint image.

In step 202, an overlap region between the $i^{th}$ entered fingerprint image and a determined template image is obtained, wherein the determined template image is generated by combining i−1 previously entered fingerprint images.

In the exemplary embodiment, after the $i^{th}$ entered fingerprint image is obtained, the terminal device performs image recognition on the $i^{th}$ entered fingerprint image and the determined template image, and takes, as the overlap region, a substantially identical part in the two images. That is, the overlap region is a substantially identical part between the $i^{th}$ entered fingerprint image and the determined template image based on image recognition.

Methods for the image recognition may include a scale invariant feature transform (SIFT) feature extraction method, an image edge extraction method, and the like.

In step 203, it is determined whether the overlap region satisfies a prompting condition, wherein the prompting condition is that an area of the overlap region is outside a specified area range. If the overlap region satisfies the prompting condition, the method 200 proceeds to step 204; otherwise, the method 200 proceeds to step 208.

In the exemplary embodiment, the prompting condition is used for setting the $i^{th}$ entered fingerprint image to be invalid and prompting the user to re-enter the fingerprint image when the $i^{th}$ entered fingerprint image does not satisfy an amount of information required by generating the fingerprint template.

In an embodiment of the present disclosure, the above specified area range may be a fixed area range, or may be an area range that is determined in real time by the terminal device according to a current progress of fingerprint template generation. The terminal device may determine in real time the specified area range in the following first and second steps.

In the first step, the terminal device obtains an area of the determined template image.

An area of an image is a value of a size of the image in a two-dimensional plane. In an embodiment of the present disclosure, the area of the determined template image may be obtained by using an image recognition and analysis method. For example, the determined template image is placed in a preset coordinate plane that includes a plurality of coordinate blocks of a fixed size (for example, the area of each coordinate block is 1 mm*1 mm). Then, the terminal device performs image recognition on the coordinate plane in which the determined template image is placed, counts a number of coordinate blocks covered by the determined template image according to a recognition result, and obtains the area of the determined template image according to the counted number of coordinate blocks.

In addition, a size of a fingerprint collection panel in the terminal device is generally known. Accordingly, the size of each fingerprint image collected by the terminal device is known (e.g., the same as the size of the fingerprint collection panel), and the determined template image is obtained by combining the fingerprint images that have been successfully collected. Therefore, the terminal device can calculate the area of the determined template image according to the area of each fingerprint image collected.

In the second step, the specified area range is determined according to the area of the determined template image.

As a number of valid fingerprint images collected by the terminal device increases, the area of each of determined template images also increases. The specified area range varies with different areas of the determined template images, and the specified area range corresponding to each of the determined template images is a fixed range. In some embodiments, the specified area range may be in positive correlation with the area of the determined template image.

In step 204, a relative direction from a second center to a first center is determined, wherein the first center is a geometric center of the $i^{th}$ entered fingerprint image entered, and the second center is a geometric center of the overlap region in the $i^{th}$ entered fingerprint image.

In an embodiment of the present disclosure, the terminal device may determine the relative direction from the second center to the first center by analyzing the $i^{th}$ entered fingerprint image and a relative position of the overlap region in the $i^{th}$ entered fingerprint image.

In some embodiments, the determined relative direction may be an indication of a direction range type, for example, an indication of one of two directions defined as up and down, or left and right; an indication of one of four directions defined as: up, down, left, and right; or an indication of one of eight directions defined as: up, upper left, upper right, down, lower left, lower right, left, and right.

In some embodiments, the determined relative direction may be a specific direction, a parameter of which may be an angular degree. The angular degree may be in the unit of degree, minute, second, or radian, for example, 30 degrees to lower right.

In step 205, the relative direction from the second center to the first center is determined as a specified direction, when the area of the overlap region is greater than a maximum value in the specified area range.

In the exemplary embodiment, when the area of the overlap region is greater than the maximum value in the specified area range, it indicates that the area of the substantially identical region between the $i^{th}$ entered fingerprint image and the determined template image is excessively large. After the finger moves according to the relative direction, the substantially identical region between the finger and the determined template image decreases, and fingerprint information of a larger part, for which fingerprints have not been entered, on the finger can be provided for the template image.

In step 206, an opposite direction to the relative direction is determined as the specified direction, when the area of the overlap region is smaller than a minimum value in the specified area range.

In the exemplary embodiment, when the area of the overlap region is smaller than the minimum value in the specified area range, it indicates that the area of the substantially identical region between the $i^{th}$ entered fingerprint image and the determined template image is excessively small. After the finger moves according to the specified direction, the substantially identical region between the finger and the determined template image increases, and a larger overlap region between the finger and the determined template image can be provided for the template image, so that the increased overlap area falls within the specified area range.

In step 207, a prompting message is presented, to instruct the user to move the finger towards the specified direction and re-enter the $i^{th}$ fingerprint image.

In step 208, the $i^{th}$ entered fingerprint image and i−1 previously entered fingerprint images are combined to generate a new determined template image.

In the exemplary embodiment, the overlap region not satisfying the prompting condition indicates that the $i^{th}$ entered fingerprint image satisfies a condition for combining with the i−1 previously entered fingerprint images, and the terminal device combines the $i^{th}$ entered fingerprint image with the i−1 previously entered fingerprint images, or with the determined template image, to generate the new determined template image. The original determined template image is deleted, and the new determined template image is retained for subsequent use.

After obtaining the new determined template image, the terminal device may further detect a numerical relationship between i and N. When i=N, the new determined template image is the final generated fingerprint template.

In the method 200, prompt information for instructing the user to move the finger can be provided during the generation of a fingerprint template of the user, thereby improving efficiency for the user to move the finger and for obtaining a fingerprint image for a part of the fingerprint that has not been collected by the terminal device.

Figure 3:
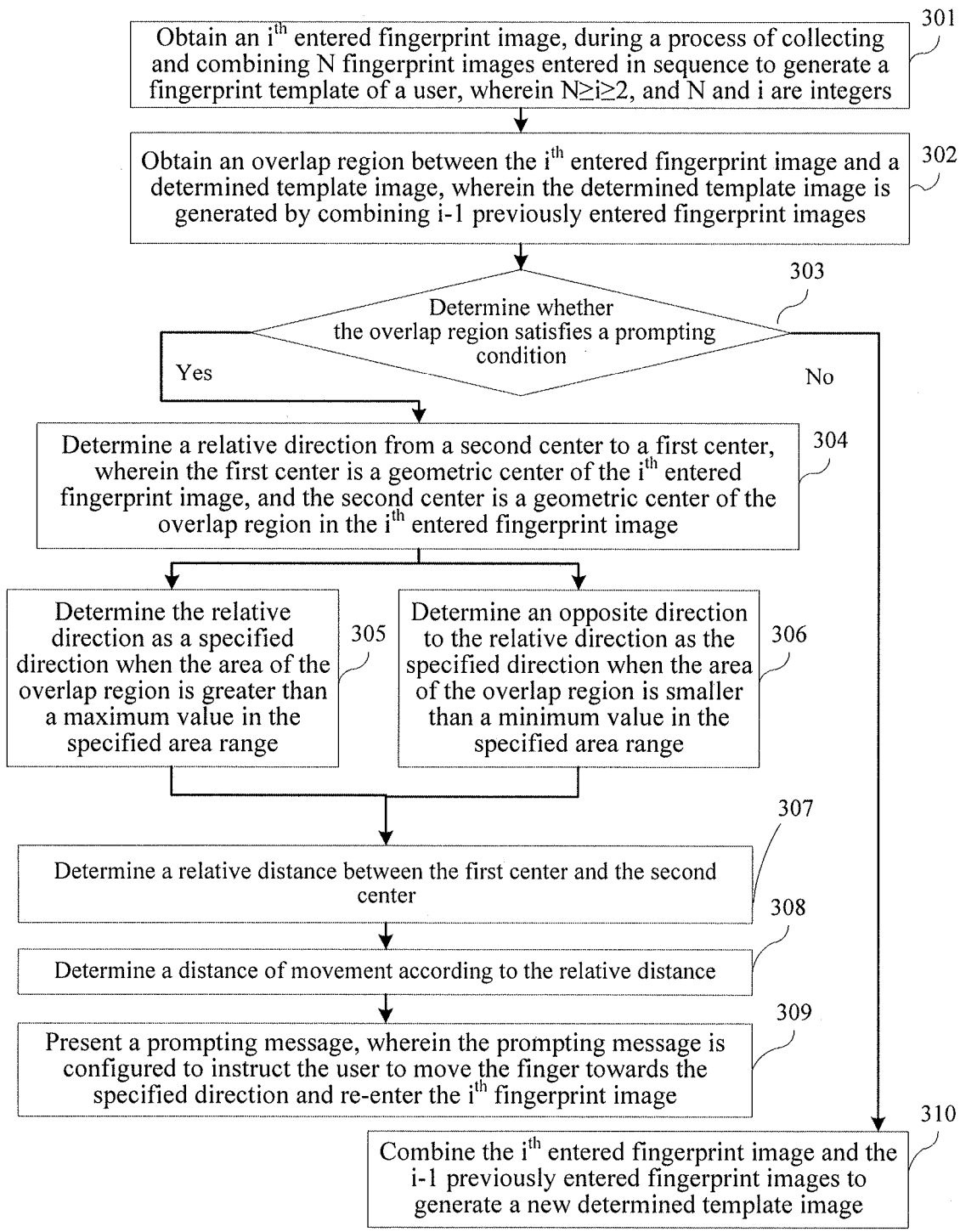
FIG. 3 is a flow chart of a fingerprint entry prompting method, according to an exemplary embodiment.

FIG. 3 is a flow chart of a fingerprint entry prompting method 300, according to an exemplary embodiment. The fingerprint entry prompting method 300 may be applied to a terminal device having a fingerprint entry prompting function. For example, the terminal device may be a smart phone, a tablet, an e-book reader, a smart wearable device, and the like. The fingerprint entry prompting method 300 may include the following steps.

In step 301, an $i^{th}$ entered fingerprint image is obtained, when collecting and combining N fingerprint images entered in sequence to generate a fingerprint template of a user, wherein N≥i≥2, and N and i are integers.

In step 302, an overlap region between the $i^{th}$ entered fingerprint image and a determined template image is obtained, wherein the determined template image is generated by combining i−1 previously entered fingerprint images.

In step 303, it is determined whether the overlap region satisfies a prompting condition, wherein the prompting condition is that an area of the overlap region is outside a specified area range. If the overlap region satisfies the prompting condition, the method 300 proceeds to step 304; otherwise, the method proceeds to step 310.

In step 304, a relative direction from a second center to a first center is determined, wherein the first center is a geometric center of the $i^{th}$ entered fingerprint image, and the second center is a geometric center of the overlap region in the $i^{th}$ entered fingerprint image.

In step 305, the relative direction from the second center to the first center is determined to be a specified direction, when the area of the overlap region is greater than a maximum value in the specified area range In step 306, an opposite direction to the relative direction is determined as the specified direction, when the area of the overlap region is smaller than a minimum value in the specified area range.

Step 301 to step 306 are similar to step 201 to step 206 (FIG. 2).

In step 307, a relative distance between the first center and the second center is determined. As noted above, the first center is a geometric center of the $i^{th}$ entered fingerprint image, and the second center is a geometric center of the overlap region in the $i^{th}$ entered fingerprint image.

In determining the relative distance, respective positions of the first center and the second center are determined and, then, the relative distance between the first center and the second center is obtained by means of image recognition.

In step 308, a distance of movement is determined according to the determined relative distance.

In an embodiment, the distance of movement is in positive correlation with the determined relative distance. The determined relative distance may be a distance measured in a unit, or may be a relative distance with respect to a reference object.

When the determined relative distance is a distance measured in a unit, the unit of the relative distance may be millimeter or centimeter in consideration of the size of a finger. The unit of the distance may also be nanometer, decimeter, meter, and the like.

Figure 4:
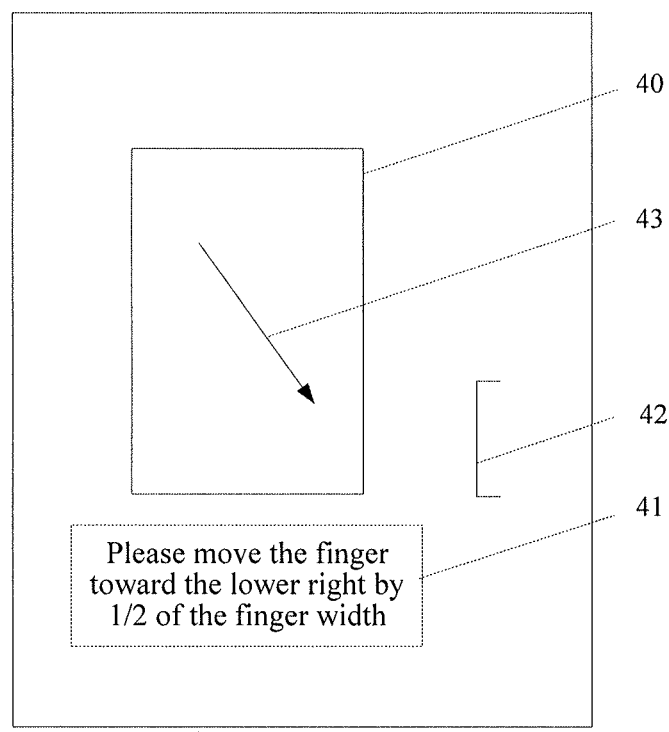
FIG. 4 is a schematic diagram of a display interface, according to an exemplary embodiment.

When the determined relative distance is a relative distance with respect to a reference object, the reference object may be a finger of the user. For example, the user is instructed to move by a distance of ½ of the width of one finger, a distance of ⅓ of the width of one finger, a distance of ¼ of the width of one finger, or the like. In some embodiments, the reference object may be a reference scale as shown in FIG. 4. The reference scale may be provided without denoting the actual distance, but instead using a line segment to represent the actual distance of movement required.

FIG. 4 is a schematic diagram of a display interface 400 on a screen of a terminal device, according to an exemplary embodiment. On the display interface 400, a collecting region 40 is used for displaying an effective working area of a fingerprint collecting unit. Prompt information 41 is used for prompting the user with a direction and a distance of movement, which may be a distance measured by a unit or a distance with reference to a size of the finger. A reference scale 42 may be used for prompting the user of the length of one reference unit, and in such an embodiment, the prompt information 41 is used for prompting the user with a number of reference units by which the user needs to move the finger. In some embodiments, a movement indication line 43 may be further displayed, and the prompt information 41 instructs the user to move the finger according to the movement indication line 43. The user directly moves the finger according to a length and a direction indicated by the movement indication line 43.

It should be noted that steps 307-308 may be performed concurrently with steps 304-306, or be performed prior to or after steps 304-306. The order in which steps 307-308 and steps 304-306 are performed is not limited in the present disclosure.

In step 309, a prompting message and the distance of movement are presented, wherein the prompting message is configured to instruct the user to move the finger towards the specified direction and re-enter the $i^{th}$ fingerprint image.

In step 310, the $i^{th}$ entered fingerprint image and i–1 previously entered fingerprint images are combined to generate a new determined template image.

In the method 300, prompt information for instructing the user to move the finger can be provided during the generation of a fingerprint template of the user, thereby improving efficiency for the user to move the finger and for obtaining a fingerprint image for a part of the fingerprint that has not been collected by the terminal device.

Figure 5:
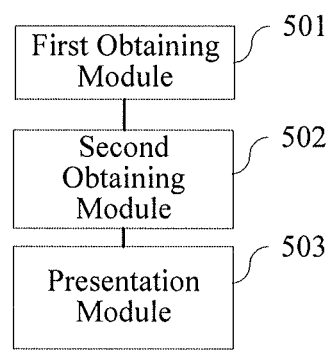
FIG. 5 is a block diagram of a fingerprint entry prompting device, according to an exemplary embodiment.

FIG. 5 is a block diagram of a fingerprint entry prompting device 500, according to an exemplary embodiment. The fingerprint entry prompting device 500 may be implemented as the entire or part of a terminal device having a fingerprint entry prompting function by means of software, hardware, or a combination thereof. For example, the terminal device may be a smart phone, a tablet, an e-book reader, a smart wearable device, and the like. The fingerprint entry prompting device 500 includes a first obtaining module 501, a second obtaining module 502, and a presentation module 503.

The first obtaining module 501 is configured to obtain an $i^{th}$ entered fingerprint image, during a process of collecting and combining N fingerprint images entered in sequence to generate a fingerprint template, where N≥i≥2, and N and i are integers.

The second obtaining module 502 is configured to obtain an overlap region between the $i^{th}$ entered fingerprint image and a determined template image, wherein the determined template image is generated by combining i–1 previously entered fingerprint images.

The presentation module 503 is configured to present a prompting message when the overlap region satisfies a prompting condition, wherein the prompting message is configured to instruct the user to move a finger towards a specified direction and re-enter the $i^{th}$ fingerprint image.

Figure 6:
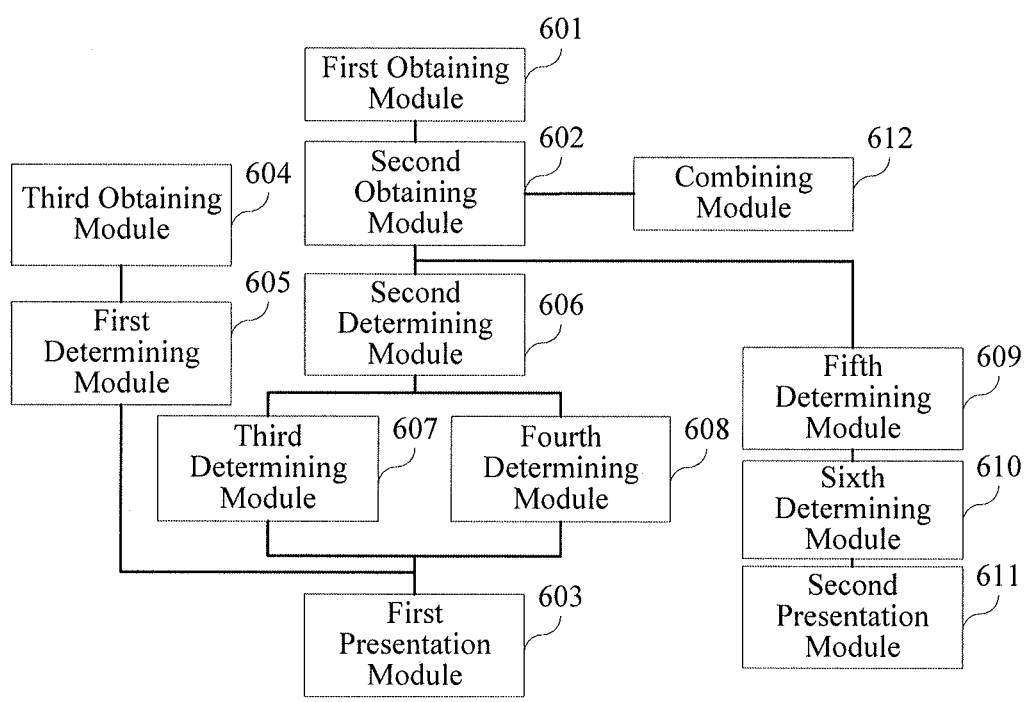
FIG. 6 is a block diagram of a fingerprint entry prompting device, according to an exemplary embodiment.

FIG. 6 is a block diagram of a fingerprint entry prompting device 600, according to an exemplary embodiment. The fingerprint entry prompting device 600 may be implemented as the entire or part of a terminal device having a fingerprint entry prompting function by means of software, hardware, or a combination thereof. For example, the terminal device may be a smart phone, a tablet, an e-book reader, a smart wearable device, and the like. The fingerprint entry prompting device 600 includes a first obtaining module 601, a second obtaining module 602, and a first presentation module 603.

The first obtaining module 601 is configured to obtain an $i^{th}$ entered fingerprint image, during a process of collecting and combining N fingerprint images entered in sequence to generate a fingerprint template, wherein N≥i≥2, and N and i are integers.

The second obtaining module 602 is configured to obtain an overlap region between the $i^{th}$ entered fingerprint image and a determined template image, wherein the determined template image is generated by combining i–1 previously entered fingerprint images.

The first presentation module 603 is configured to present a prompting message when the overlap region satisfies a prompting condition, wherein the prompting message is configured to instruct the user to move a finger towards a specified direction and re-enter the $i^{th}$ fingerprint image.

In some embodiments, the prompting condition includes that an area of the overlap region is outside a specified area range.

In some embodiments, the device 600 further includes: a third obtaining module 604 and a first determining module 605.

The third obtaining module 604 is configured to obtain an area of the determined template image before the first presentation module 603 presents the prompting message, when the overlap region satisfies the prompting condition.

The first determining module 605 is configured to determine the specified area range according to the area of the determined template image.

In some embodiments, the device 600 further includes a second determining module 606, a third determining module 607, and a fourth determining module 608.

The second determining module 606 is configured to determine a relative direction from a second center to a first center before the first presentation module 603 presents the prompting message when the overlap region satisfies the prompting condition, wherein the first center is a geometric center of the $i^{th}$ entered fingerprint image, and the second center is a geometric center of the overlap region in the $i^{th}$ entered fingerprint image.

The third determining module 607 is configured to determine the relative direction as the specified direction when the area of the overlap region is greater than a maximum value in the specified area range.

The fourth determining module 608 is configured to determining an opposite direction to the relative direction as the specified direction when the area of the overlap region is smaller than a minimum value in the specified area range.

In some embodiments, the device 600 further includes a fifth determining module 609, a sixth determining module 610, and a second presentation module 611.

The fifth determining module 609 is configured to determine a relative distance when the overlap region satisfies the prompting condition, where the relative distance is a distance from a second center to a first center, the first center is the geometric center of the $i^{th}$ entered fingerprint image, and the second center is the geometric center of the overlap region in the $i^{th}$ entered fingerprint image.

The sixth determining module 610 is configured to determine a distance of movement according to the relative distance.

The second presentation module 611 is configured to present the distance of movement when presenting the prompting message.

In some embodiments, the device 600 further includes a combining module 612.

The combining module 612 is configured to combine the $i^{th}$ entered fingerprint image and the i−1 previously entered fingerprint images to generate a new determined template image, when the overlap region does not satisfy the prompting condition.

An exemplary embodiment of the present disclosure further provides a fingerprint entry prompting device which can implement the fingerprint entry prompting methods described above. The device includes a processor and a memory for storing instructions executable by the processor. The processor is configured to execute the instructions to perform the above described methods.

Figure 7:
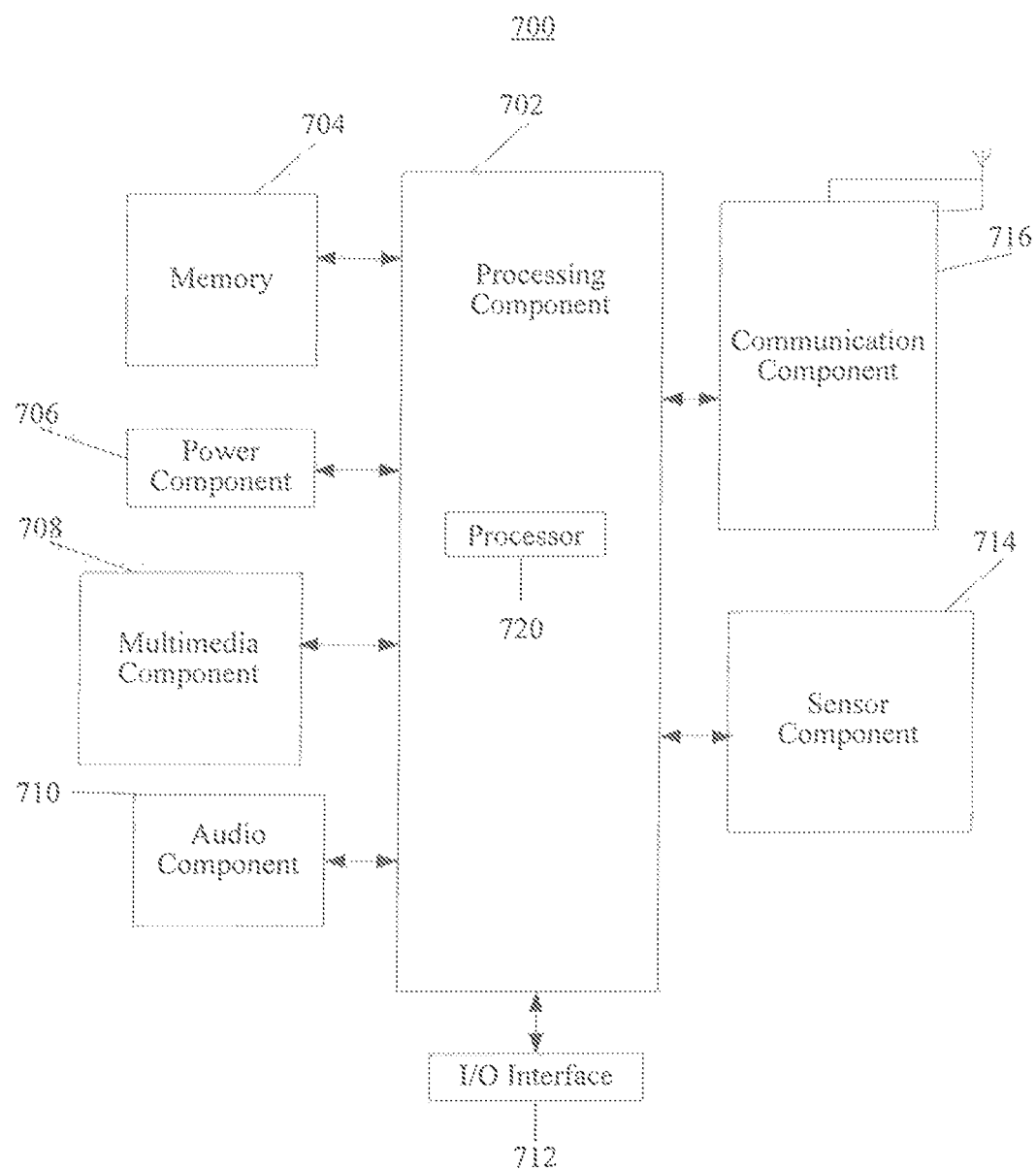
FIG. 7 is a block diagram of a device, according to an exemplary embodiment.

FIG. 7 is a block diagram of a device 700, according to an exemplary embodiment. For example, the device 700 may be a mobile phone, a computer, a digital broadcast terminal, a messaging device, a gaming console, a tablet, a medical device, exercise equipment, a personal digital assistant, and the like.

Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and/or the rear camera may receive an external multimedia datum while the device 700 is in an operation mode, such as a photographing mode or a video mode. Each of the front camera and the rear camera may be a fixed optical lens system or have focus and optical zooming capability.

The audio component 710 is configured to output and/or input audio signals. For example, the audio component 710 includes a microphone configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wireless, between the device 700 and other devices. The device 700 can access a wireless network based on a communication standard, such as WiFi, 2G, 3G, or 4G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, there is also provided a non-transitory computer-readable storage medium including instructions, such as included in the memory 704, executable by the processor 720 in the device 700, for performing the above-described methods. For example, the non-transitory computer-readable storage medium may be a ROM, a random access memory (RAM), a CD-ROM, a magnetic tape, a floppy disc, an optical data storage device, and the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of submodules.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A fingerprint entry prompting method, comprising:
   obtaining an $i^{th}$ entered fingerprint image, during a process of collecting and combining N fingerprint images entered in sequence to generate a fingerprint template of a user, wherein $N \geq i \geq 2$, and N and i are integers;
   obtaining an overlap region between the $i^{th}$ entered fingerprint image and a determined template image, wherein the determined template image is generated by combining i−1 previously entered fingerprint images;
   determining a relative direction from a second center to a first center, wherein the first center is a geometric center of the $i^{th}$ entered fingerprint image, and the second center is a geometric center of the overlap region in the $i^{th}$ entered fingerprint image;
   presenting a prompting message when the overlap region satisfies a prompting condition, wherein the prompting message is configured to instruct the user to move a finger towards a specified direction and re-enter the $i^{th}$ fingerprint image, and wherein the prompting condition comprises that an area of the overlap region is outside of a specified area range,
   combining the $i^{th}$ entered fingerprint image and the i−1 previously entered fingerprint images to generate a new determined template image, when the overlap region does not satisfy the prompting condition; and
   wherein the relative direction is determined as the specified direction when the area of the overlap region is greater than a maximum value in the specified area range, and an opposite direction of the relative direction is determined as the specified direction when the area of the overlap region is smaller than a minimum value in the specified area range.

2. The method according to claim 1, further comprising:
   obtaining an area of the determined template image, before the presenting of the prompting message; and
   determining the specified area range according to the area of the determined template image.

3. The method according to claim 1, further comprising:
   determining a relative distance between the first center and the second center when the overlap region satisfies the prompting condition;
   determining a distance of movement according to the relative distance; and
   presenting the distance of movement when presenting the prompting message.

4. A fingerprint entry prompting device, comprising:
   a processor; and
   a memory for storing instructions executable by the processor;
   wherein the processor is configured to:
   obtain an $i^{th}$ entered fingerprint image, during a process of collecting and combining N fingerprint images entered in sequence to generate a fingerprint template of a user, wherein $N \geq i \geq 2$, and N and i are integers;
   obtain an overlap region between the $i^{th}$ entered fingerprint image and a determined template image, wherein the determined template image is generated by combining i−1 previously entered fingerprint images;
   determine a relative direction from a second center to a first center, wherein the first center is a geometric center of the $i^{th}$ entered fingerprint image, and the second center is a geometric center of the overlap region in the $i^{th}$ entered fingerprint image; and
   present a prompting message when the overlap region satisfies a prompting condition, wherein the prompting message is configured to instruct the user to move a finger towards a specified direction and re-enter the $i^{th}$ fingerprint image, and wherein the prompting condition comprises that an area of the overlap region is outside a specified area range,
   wherein the relative direction is determined as the specified direction when the area of the overlap region is greater than a maximum value in the specified area range, and an opposite direction of the relative direction is determined as the specified direction when the area of the overlap region is smaller than a minimum value in the specified area range.

5. The fingerprint entry prompting device according to claim 4, wherein the processor is further configured to:
   obtain an area of the determined template image, before presenting the prompting message when the overlap region satisfies the prompting condition; and
   determine the specified area range according to the area of the determined template image.

6. The fingerprint entry prompting device according to claim 4, wherein the processor is further configured to:
   determine a relative distance between the first center and the second center when the overlap region satisfies the prompting condition;
   determine a distance of movement according to the relative distance; and
   present the distance of movement when presenting the prompting message.

7. The fingerprint entry prompting device according to claim 4, wherein the processor is further configured to:

combine the $i^{th}$ entered fingerprint image and the i–1 previously entered fingerprint images to generate a new determined template image, when the overlap region does not satisfy the prompting condition.

8. A non-transitory computer-readable storage medium having stored therein instructions that, when executed by a processor in a device, cause the device to perform a fingerprint entry prompting method comprising:

obtaining an $i^{th}$ entered fingerprint image, during a process of collecting and combining N fingerprint images entered in sequence to generate a fingerprint template of a user, wherein N≥i≥2, and N and i are integers;

obtaining an overlap region between the $i^{th}$ entered fingerprint image and a determined template image, wherein the determined template image is generated by combining i–1 previously entered fingerprint images;

determining a relative direction from a second center to a first center, wherein the first center is a geometric center of the $i^{th}$ entered fingerprint image, and the second center is a geometric center of the overlap region in the $i^{th}$ entered fingerprint image; and presenting a prompting message when the overlap region satisfies a prompting condition, wherein the prompting message is configured to instruct the user to move a finger towards a specified direction and re-enter the $i^{th}$ fingerprint image, and wherein the prompting condition comprises that an area of the overlap region is outside a specified area range, wherein the relative direction is determined as the specified direction when the area of the overlap region is greater than a maximum value in the specified area range, and an opposite direction of the relative direction is determined as the specified direction when the area of the overlap region is smaller than a minimum value in the specified area range.

9. The non-transitory computer-readable storage medium according to claim 8, wherein the method further comprises:

obtaining an area of the determined template image before the presenting of the prompting message; and determining the specified area range according to the area of the determined template image.

10. The non-transitory computer-readable storage medium according to claim 8, wherein the method further comprises:

determining a relative distance between the first center and the second center when the overlap region satisfies the prompting condition;

determining a distance of movement according to the relative distance; and presenting the distance of movement when presenting the prompting message.

11. The non-transitory computer-readable storage medium according to claim 8, wherein the method further comprises:

combining the $i^{th}$ entered fingerprint image and the i–1 previously entered fingerprint images to generate a new determined template image, when the overlap region does not satisfy the prompting condition.

* * * * *